United States Patent
Wang et al.

(10) Patent No.: US 8,205,301 B2
(45) Date of Patent: Jun. 26, 2012

(54) HINGE ASSEMBLY AND ELETRONIC DEVICE USING THE SAME

(75) Inventors: Jin-Xin Wang, Shenzhen (CN); Lian-Cheng Huang, Shenzhen (CN); Jian Li, Shenzhen (CN); Guo-Jin Cai, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 378 days.

(21) Appl. No.: 12/488,723

(22) Filed: Jun. 22, 2009

(65) Prior Publication Data

US 2010/0275412 A1    Nov. 4, 2010

(30) Foreign Application Priority Data

Apr. 29, 2009    (CN) .......................... 2009 1 0301970

(51) Int. Cl.
*E05D 11/10* (2006.01)
(52) U.S. Cl. .................. 16/330; 16/303; 16/307; 16/341
(58) Field of Classification Search .................... 16/307, 16/330, 303, 284, 289, 306, 337, 280, 325–328, 16/334–335, 308, 340, 256, 285, 341; 74/567, 74/569; 361/679.02, 679.27
See application file for complete search history.

(56) References Cited

U.S. PATENT DOCUMENTS

| | | | | |
|---|---|---|---|---|
| 5,894,633 A * | 4/1999 | Kaneko | ........................... | 16/306 |
| 6,108,868 A * | 8/2000 | Lin | ................................. | 16/340 |
| 6,459,887 B2 * | 10/2002 | Okuda | ........................ | 455/90.1 |
| 6,481,057 B2 * | 11/2002 | Lin | ................................. | 16/340 |
| 6,568,034 B2 * | 5/2003 | Cho | ............................... | 16/337 |
| 6,633,643 B1 * | 10/2003 | Ona | ........................ | 379/433.13 |
| 6,779,234 B1 * | 8/2004 | Lu et al. | ......................... | 16/340 |
| 7,338,019 B2 * | 3/2008 | Liu et al. | .................. | 248/123.11 |
| 7,536,749 B2 * | 5/2009 | Lu et al. | .......................... | 16/330 |
| 2006/0050867 A1 * | 3/2006 | Kawamoto | ............... | 379/433.13 |
| 2006/0185126 A1 * | 8/2006 | Su | .................................. | 16/340 |
| 2007/0011847 A1 * | 1/2007 | Luo | ................................ | 16/303 |
| 2009/0064461 A1 * | 3/2009 | Yin et al. | ........................ | 16/330 |
| 2009/0255090 A1 * | 10/2009 | Kim et al. | ....................... | 16/297 |
| 2009/0255091 A1 * | 10/2009 | Jung et al. | ...................... | 16/308 |

* cited by examiner

*Primary Examiner* — Victor Batson
*Assistant Examiner* — Matthew Sullivan
(74) *Attorney, Agent, or Firm* — Altis Law Group, Inc.

(57) ABSTRACT

A hinge assembly includes a first bracket, a second bracket, a damping member, and a torsion resilient member. The first bracket defines a damping protrusion. The second bracket is rotatable relative to the first bracket. The damping member defines a depression. The damping protrusion is configured to engage with the depression. The torsion resilient member urges the first bracket to rotate relative to the second bracket and the damping member. The engagement of damping protrusion and the depression prevents the first bracket from rotating when the first bracket rotates through a predetermined angle. When the first bracket rotates through the predetermined angle relative to the second bracket and the damping member, the first bracket together with the damping member are rotatable relative to the second bracket to any desired angle.

12 Claims, 6 Drawing Sheets

HINGE ASSEMBLY AND ELETRONIC DEVICE USING THE SAME

BACKGROUND

1. Technical Field

The present disclosure generally relates to hinge assemblies and electronic devices, particularly, to a hinge assembly with a torsion resilient member for electronic devices.

2. Description of Related Art

Electronic devices such as mobile phones, personal digital assistants (PDAs), notebooks, and desktop computers with a display device are in widespread use, and consumers may now enjoy the full convenience of high technology products almost anytime and anywhere. These devices often use hinges to fold the devices to maintain a compact shape.

A typical hinge assembly includes a torsion spring with two ends connecting a main body to a cover, for example, in a notebook. The torsion spring is compressed when the cover is folded upon the main body. The notebook further includes a latch to latch the cover to the main body. When the latch is released, the cover rotates relative to the main body through a small angle under the force of the torsion spring. The small angle between the cover and the main body allows a user to conveniently open the cover to a desired angle. However, a large counterforce is applied on the torsion spring and a strong impact can spread to other components of the hinge assembly. Therefore, the torsion spring and the other components are easily damaged under the large force and strong impact.

Therefore, a new hinge assembly and an electronic device are desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTIONS

Figure 1:
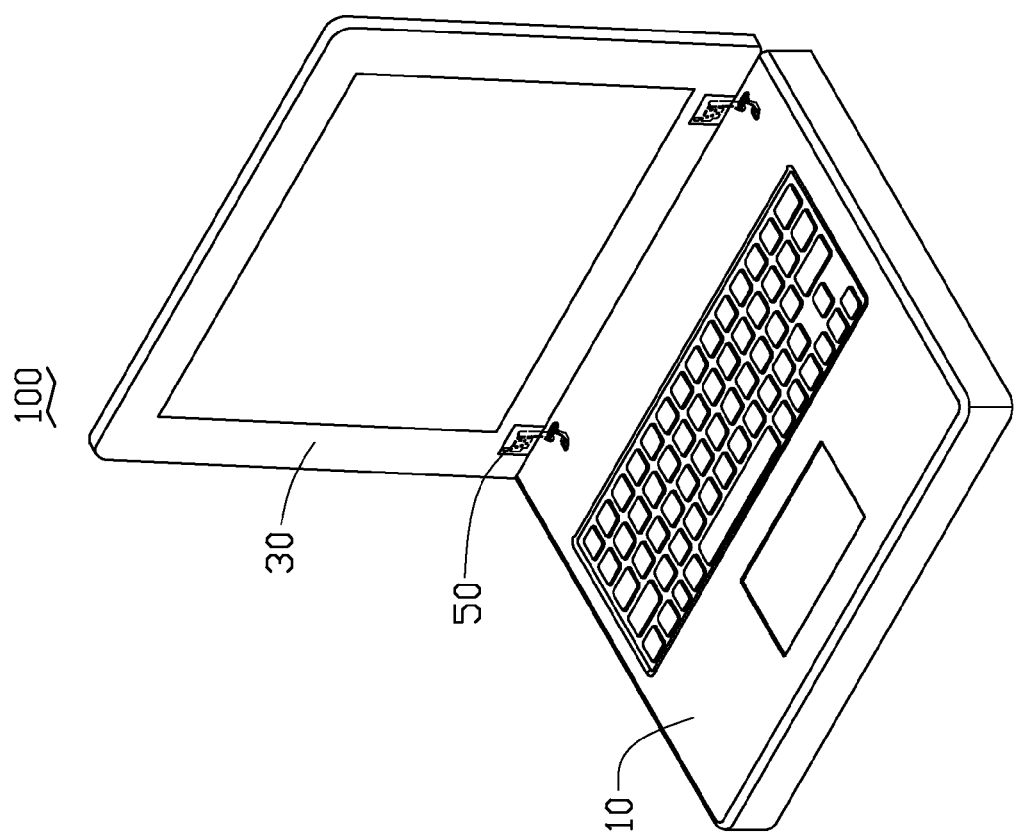
FIG. 1 is perspective view of an embodiment of an electronic device utilizing an embodiment of the hinge assembly.

Referring to FIG. 1, an embodiment of an electronic device 100 includes a main body 10, a cover 30, and two hinge assemblies 50 for pivotally connecting the main body 10 and the cover 30.

Figure 2:
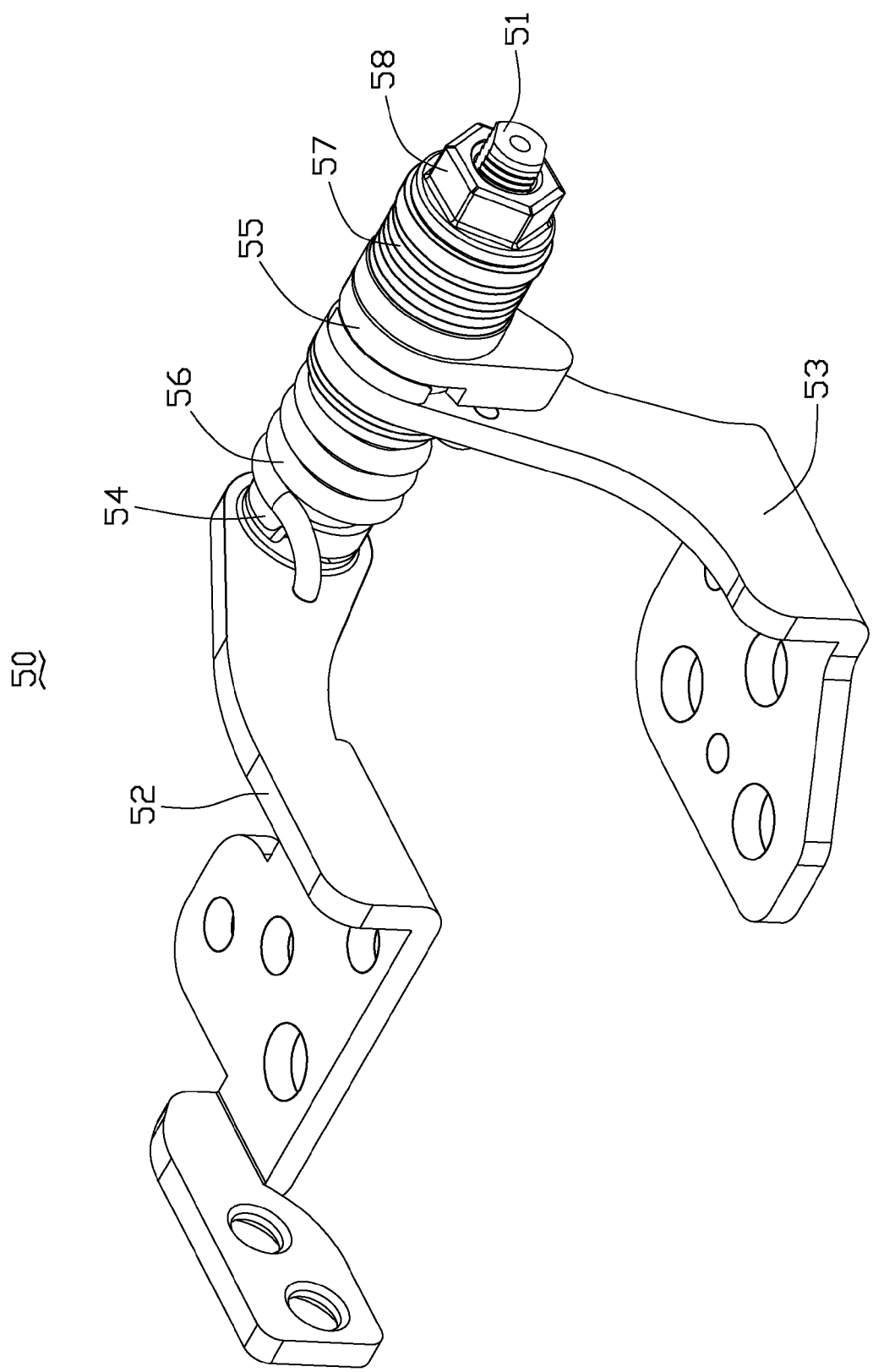
FIG. 2 is an assembled, perspective view of the hinge assembly of FIG. 1.
Figure 3:
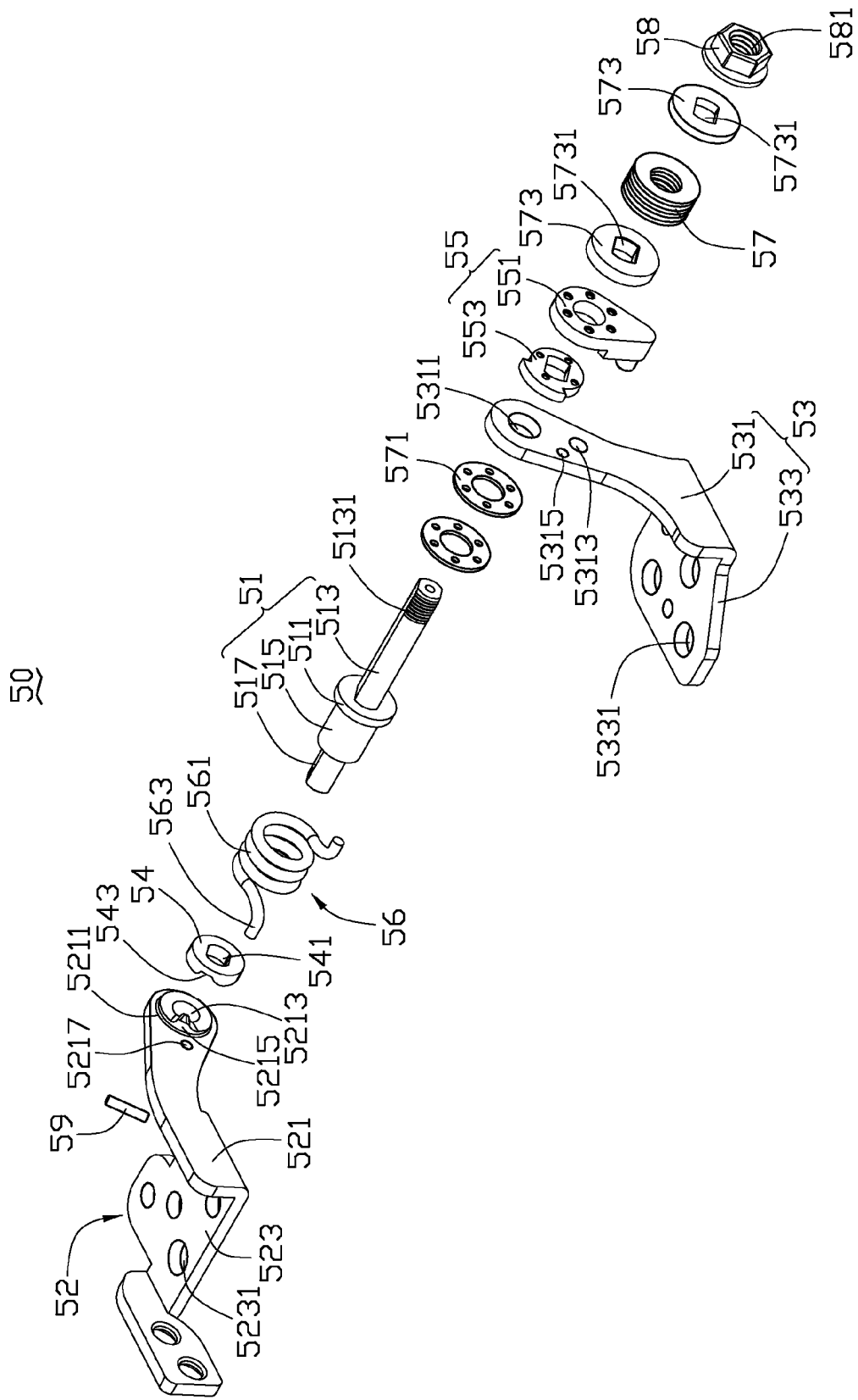
FIG. 3 is an exploded, perspective view of the hinge assembly of FIG. 2.

Referring to FIG. 2 and FIG. 3, the hinge assembly 50 includes a shaft 51, a first bracket 52, a second bracket 53, a damping member 54, a limiting unit 55, a torsion resilient member 56, an elastic unit 57, a first fastening member 58, and a second fastening member 59.

Figure 4:
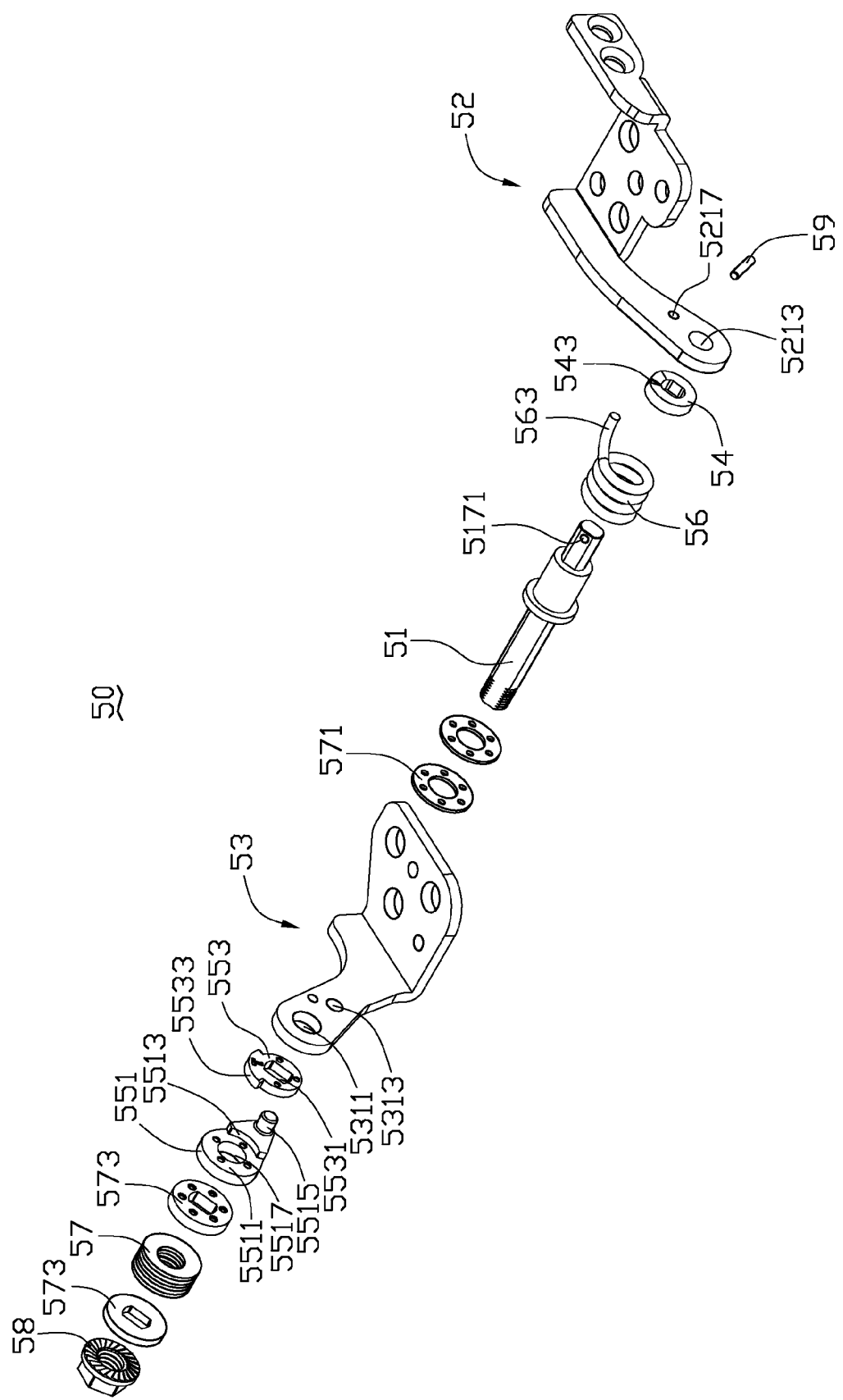
FIG. 4 is an exploded, perspective view of the hinge assembly of FIG. 2, but viewing from another aspect.

Referring also to FIG. 4, the shaft 51 includes a flange 511, a first shaft portion 513, a joining portion 515, and a second shaft portion 517. The first shaft portion 513, the flange 511, the joining portion 515, and the second shaft portion 517 are arranged in that order. The first shaft portion 513 and the second shaft portion 517 have non-circular cross-sections, and the flange 511 and the joining portion 515 have substantially circular cross-sections. The flange 511 has a diameter larger than other portions. The first shaft portion 513 has a threaded portion 5131 at an end away from the flange 511. The second shaft portion 517 defines a pinhole 5171.

The first bracket 52 includes a pivot wing 521 and a connecting wing 523 substantially perpendicular to the pivot wing 521. The pivot wing 521 includes a positioning end 5211. The pivot wing 521 defines a circular pivot hole 5213 running through the positioning end 5211. A damping protrusion 5215 having a curved surface is formed on the positioning end 5211. The positioning end 5211 further defines a first fixing hole 5217 adjacent to the pivot hole 5213. The connecting wing 523 defines a plurality of assembling holes 5231 to connect the first bracket 52 to the cover 30.

The second bracket 53 includes a first connecting plate 531 and a second connecting plate 533 substantially perpendicular to the first connecting plate 531. The first connecting plate 531 defines a circular pivot hole 5311 at an end, a latching hole 5313, and a second fixing hole 5315 adjacent to the latching hole 5313. The second connecting plate 533 defines a plurality of assembling holes 5331 to connect the second bracket 53 to the main body 10.

The damping member 54 is substantially disk-shaped and has a size corresponding to a size of the positioning end 5211. The damping member 54 defines a non-circular engaging hole 541 in a center and a depression 543 at an end surface. The damping member 54 has a bottom surface and a curved surface in the depression 543.

The limiting unit 55 includes a steady member 551 and a rotatable member 553 rotatably engaged with the steady member 551. The steady member 551 includes a base 5511, a limiting protrusion 5513 formed from an end of the base 5511, and a latching pole 5515 to engage in the latching hole 5313 of the second bracket 53. The base 5511 defines a circular pivot hole 5517. The rotatable member 553 defines a non-circular engaging hole 5531 and forms a limiting flange 5533 at part of a periphery. The limiting flange 5533 engages with the limiting protrusion 5513 to restrict a rotation angle between the rotatable member 553 and the steady member 551.

The torsion resilient member 56 may be a torsion spring as shown in the illustrated embodiment. The torsion resilient member 56 includes a coiled portion 561 and two fixing ends 563. The torsion resilient member 56 is sleeved on the joining portion 515 of the shaft 51 and the fixing ends 563 are fixed in the first fixing hole 5217 and the second fixing hole 5315 correspondingly.

The elastic unit 57 includes a group of elastic pieces. The elastic unit 57 is sleeved on the first shaft portion 513 of the shaft 51.

The hinge assembly 50 further includes friction pieces 571 and washers 573. The washer 573 defines a non-circular engaging hole 5731. The first fastening member 58 may be a nut defining a threaded hole 581. The first fastening member 58 engages with the threaded portion 5131 of the shaft 51. The second fastening member 59 may be a pin to engage in the pinhole 5171 of the shaft 51. The first and second fastening members 58, 59 are configured to prevent other components from falling off the shaft 51.

To assemble the hinge assembly 50, the torsion resilient member 56 is sleeved on the joining portion 515. The second shaft portion 517 runs through the engaging hole 541 of the damping member 54 and the pivot hole 5213 of the first bracket 52. The first shaft portion 513 runs through two friction pieces 571, the pivot hole 5311 of the second bracket 53, the engaging hole 5531 of the rotatable member 553, the pivot hole 5517 of the steady member 551, the engaging hole 5731 of one washer 573, the elastic unit 57, and the engaging hole 5731 of another washer 573, in that order. The latching pole 5515 is latched in the latching hole 5313. The first fastening member 58 is screwed on the threaded portion 5131 of the shaft 51, and the second fastening member 59 is engaged in the pinhole 5171 of the shaft 51. Finally, the fixing ends 563 of the torsion resilient member 56 are latched in the first and second fixing holes 5217, 5315, thereby completing assembly of the hinge assembly 50. The damping member 54, the rotatable member 553, and the washers 573 are non-rotatably engaged with the shaft 51. The first bracket 52, the second bracket 53, and the steady member 551 are rotatably sleeved on the shaft 51. When the damping protrusion 5215 of the first bracket 52 is fully received in the depression 543 of the damping member 54, the first bracket 52 is non-rotatable relative to the shaft 51.

Figure 5:
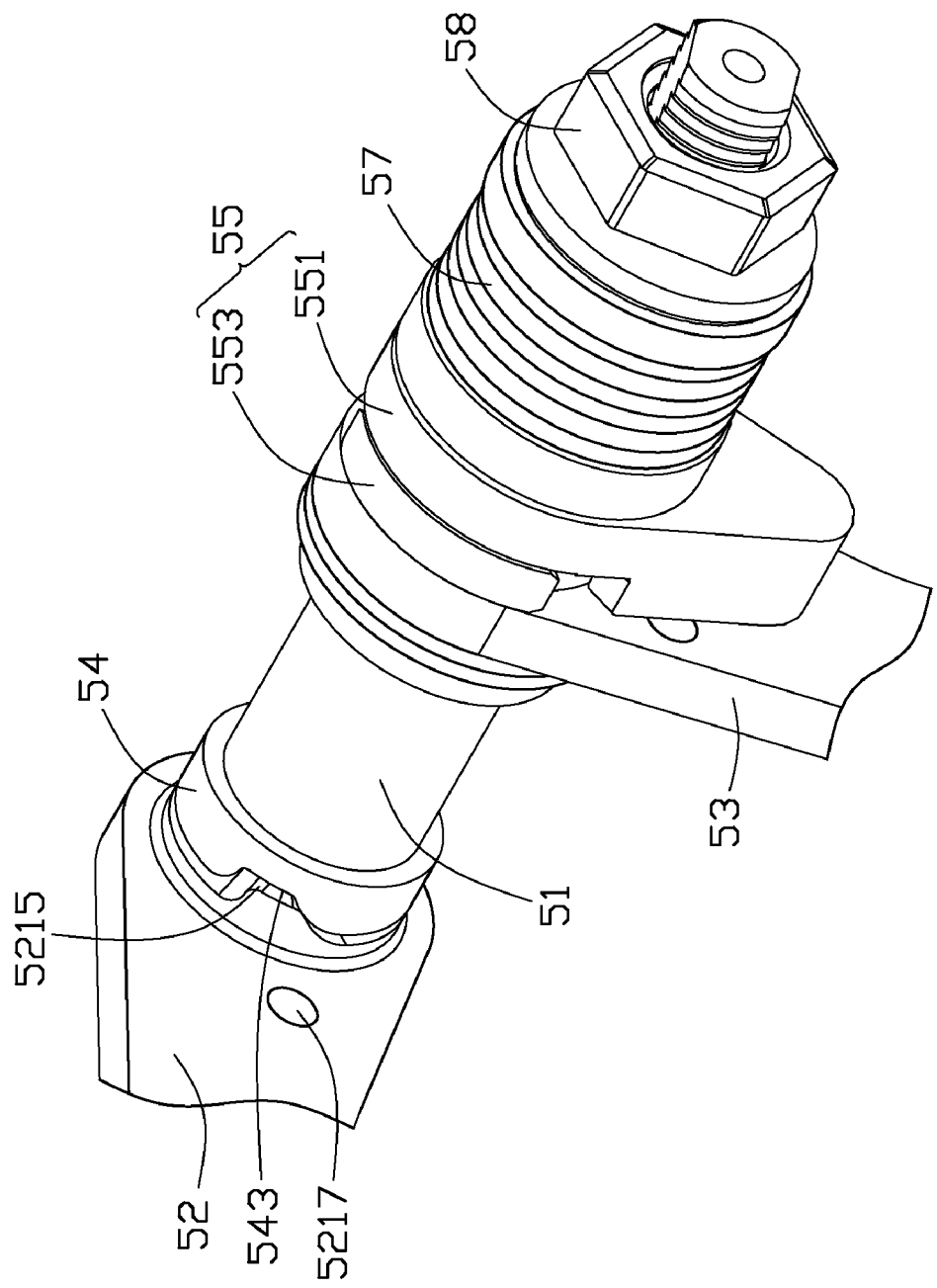
FIG. 5 is a perspective view of the hinge assembly of FIG. 2, showing a first state of the hinge assembly.

The first bracket 52 is fixed to the cover 30 and the second bracket 53 is fixed to the main body 10. The cover 30 may be held to the main body 10 via a latching mechanism (not shown), such as hooks or magnetic members. Referring to FIG. 5, when the cover 30 is folded upon the main body 10, the torsion resilient member 56 is compressed, and the damping protrusion 5215 of the first bracket 52 is partially received in the depression 543 of the damping member 54, i.e., the curved surface of the first bracket 52 resists a middle portion of the curved surface of the damping member 54.

Figure 6:
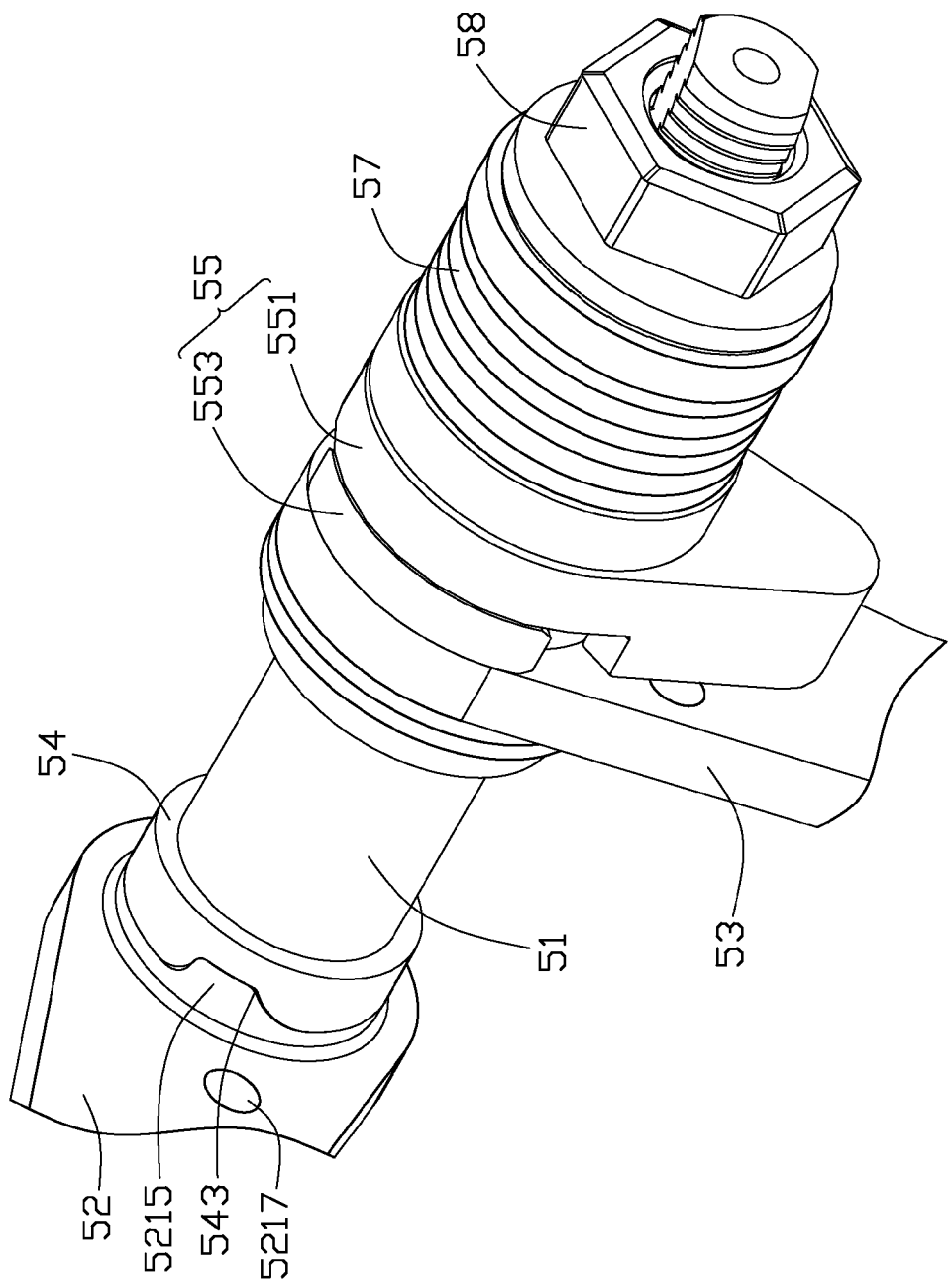
FIG. 6 is perspective view of the hinge assembly of FIG. 2, showing a second state of the hinge assembly.

Referring to FIG. 6, when the latching mechanism is released to unfold the cover 30 from the main body 10, the first bracket 51 automatically rotates relative to the second bracket 52 under an elastic force generated by the torsion resilient member 56. The first bracket 51 also rotates relative to the damping member 54 and the damping protrusion 5215 slides in the depression 543. The first bracket 51 stops rotating when the damping protrusion 5215 is fully engaged in the depression 543. As such, the cover 30 is opened through a small angle relative to the main body 10. Subsequently, an external force can be applied on the cover 30 to open the cover 30 to a desired angle. The small angle caused by the force of the torsion resilient member 56 facilitates external force applied to the cover 30. The engagement of the damping protrusion 5215 and the depression 543 determines the angular displacement of the small angle.

During the rotation of the cover 30, the first bracket 52 together with the damping member 54, the shaft 51, and the rotatable member 553 rotate relative to the second bracket 53 and the steady member 551. When the limiting flange 5533 of the rotatable member 553 resists the limiting protrusion 5513 of the steady member 551, the first bracket 52 can not rotate any further. Thus, the cover 30 reaches an ultimate position.

In the electronic device 100, the torsion resilient member 56 opens the cover 30 automatically to a predetermined small angle so that the cover 30 can be conveniently opened further by the opening force. The small angle is determined by the engagement of the damping protrusion 5215 of the first bracket 52 and the depression 543 of the damping member 54. A friction is generated between the first bracket 52 and the damping member 54, thus reducing impact between the components. In addition, the engaged surfaces of the first bracket 52 and the damping member 54 are curved surface. Therefore, the damping protrusion 5215 slides smoothly in the depression 543.

In alternative embodiments, the damping protrusion 5215 may be formed on the damping member 54, and the depression 543 may be defined in the first bracket 52.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A hinge assembly, comprising:
a first bracket defining one of a damping protrusion and a depression;
a second bracket being rotatable relative to the first bracket;
a damping member defining the other one of the damping protrusion and the depression, the damping protrusion engaging with the depression; and
a torsion resilient member connected to the first bracket and the second bracket to urge the first bracket to rotate relative to the second bracket and the damping member;
wherein the engagement of the damping protrusion and the depression prevents the first bracket from rotating relative to the damping member, and the first bracket together with the damping member are rotatable relative to the second bracket to any desired angle;
wherein the hinge assembly further comprises a shaft, a limiting unit, an elastic unit, a first fastening member, and a second fastening member; the first bracket, the second bracket, the limiting unit, the torsion resilient member, and the elastic unit are sleeved on the shaft, with the first and second fastening members positioned at opposite ends of the shaft; the limiting unit comprises a steady member and a rotatable member rotatably engaged with the steady member, the steady member comprises a limiting protrusion and the rotatable member comprises a limiting flange engaging with the limiting protrusion to restrict a rotation angle between the rotatable member and the steady member; the shaft comprises a flange, a first shaft portion, a joining portion, and a second shaft portion, with the first shaft portion, the flange, the joining portion, the second shaft portion arranged in that order; the flange has a diameter larger than other portions of the shaft; the damping member and the rotatable member are non-rotatably sleeved on the shaft; the first bracket, the second bracket and the steady member are rotatably sleeved on the shaft.

2. The hinge assembly of claim 1, wherein the torsion resilient member is a torsion spring comprising two fixing ends connected to the first bracket and the second bracket correspondingly.

3. The hinge assembly of claim 1, wherein the first shaft portion has a threaded portion at an end away from the flange; the first fastening member is a nut screwed on the threaded portion of the shaft; the second shaft portion defines a pinhole; the second fastening member is a pin received in the pinhole.

4. The hinge assembly of claim 1, wherein the second shaft portion of the shaft runs through the damping member and the first bracket.

5. The hinge assembly of claim 1, wherein the first shaft portion of the shaft runs through the second bracket, the rotatable member, the steady member, and the elastic unit.

6. The hinge assembly of claim 5, further comprising two friction pieces positioned between the flange and the second bracket, a first washer positioned between the steady member and the elastic unit, and a second washer positioned between the first fastening member and the elastic unit.

7. An electronic device, comprising:
a main body;
a cover rotatably connected to the main body; and
a hinge assembly to connect the cover with the main body, the hinge assembly comprising:
  a first bracket fixed to the cover and defining one of a damping protrusion and a depression;
  a second bracket fixed to the main body and rotatable relative to the first bracket;
  a damping member defining the other one of the damping protrusion and the depression, the damping protrusion engaging with the depression; and
  a torsion resilient member connected to the first bracket and the second bracket to urge the first bracket to rotate relative to the second bracket and the damping member; wherein the engagement of the damping protrusion and the depression prevents the first bracket from rotating relative to the damping member, and the first bracket together with the damping member are rotatable relative to the second bracket to any desired angle; wherein the hinge assembly further comprises a shaft, a limiting unit, an elastic unit, a first fastening member, and a second fastening member; the first bracket, the second bracket, the limiting unit, the torsion resilient member, and the elastic unit are sleeved on the shaft, with the first and second fastening members positioned at opposite ends of the shaft; the limiting unit comprises a steady member and a rotatable member rotatably engaged with the steady member, the steady member comprises a limiting protrusion and the rotatable member comprises a limiting flange engaging with the limiting protrusion to restrict a rotation angle between the rotatable member and the steady member; the shaft comprises a flange, a first shaft portion, a joining portion, and a second shaft portion, with the first shaft portion, the flange, the joining portion, the second shaft portion arranged in that order; the flange has a diameter larger than other portions of the shaft; the damping member and the rotatable member are non-rotatably sleeved on the shaft; the first bracket, the second bracket and the steady member are rotatably sleeved on the shaft.

8. The electronic device of claim 7, wherein the torsion resilient member is a torsion spring comprising two fixing ends connected to the first bracket and the second bracket correspondingly.

9. The electronic device of claim 7, wherein the first shaft portion has a threaded portion at an end away from the flange; the first fastening member is a nut screwed on the threaded portion of the shaft; the second shaft portion defines a pinhole; the second fastening member is a pin received in the pinhole.

10. The electronic device of claim 7, wherein the second shaft portion of the shaft runs through the damping member and the first bracket.

11. The electronic device of claim 7, wherein the first shaft portion of the shaft runs through the second bracket, the rotatable member, the steady member, and the elastic unit.

12. The electronic device of claim 11, wherein the hinge assembly further comprises two friction pieces positioned between the flange and the second bracket, a first washer positioned between the steady member and the elastic unit, and a second washer positioned between the first fastening member and the elastic unit.

* * * * *